(12) United States Patent
Kano et al.

(10) Patent No.: US 9,905,843 B2
(45) Date of Patent: Feb. 27, 2018

(54) NEGATIVE ELECTRODE MATERIAL AND BATTERY

(71) Applicant: Panasonic Intellectual Property Management Co., Ltd., Osaka (JP)

(72) Inventors: Akira Kano, Osaka (JP); Yukihiro Umetani, Osaka (JP); Shuji Ito, Nara (JP); Nobuhiko Hojo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 15/285,065

(22) Filed: Oct. 4, 2016

(65) Prior Publication Data

US 2017/0117534 A1    Apr. 27, 2017

(30) Foreign Application Priority Data

Oct. 22, 2015   (JP) .................................. 2015-207701

(51) Int. Cl.
| | |
|---|---|
| *H01M 4/133* | (2010.01) |
| *H01M 4/587* | (2010.01) |
| *H01M 4/62* | (2006.01) |
| *H01M 10/0525* | (2010.01) |
| *H01M 10/052* | (2010.01) |

(52) U.S. Cl.
CPC ........... *H01M 4/133* (2013.01); *H01M 4/587* (2013.01); *H01M 4/62* (2013.01); *H01M 10/0525* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 6,395,427 | B1 | 5/2002 | Sheem et al. |
| 6,485,864 | B1 | 11/2002 | Miyazawa et al. |
| 6,521,380 | B1 | 2/2003 | Ryu et al. |

FOREIGN PATENT DOCUMENTS

| | | |
|---|---|---|
| EP | 1482582 | 12/2004 |
| EP | 2784860 | 10/2014 |
| JP | 2000-313609 | 11/2000 |

OTHER PUBLICATIONS

The Extended European Search Report dated Dec. 15, 2016 for the related European Patent Application No. 16193029.2.

*Primary Examiner* — Oi K Conley
(74) *Attorney, Agent, or Firm* — McDermott Will & Emery LLP (57) ABSTRACT

A negative electrode material includes a carbon material including boron. In a B1s spectrum of the carbon material which is measured by X-ray photoelectron spectroscopy, the ratio of the area of a peak that occurs at a binding energy of 187.0 eV or more and 188.5 eV or less to the total area of peaks that occur at a binding energy of 184.0 eV or more and 196.5 eV or less is 50% or more.

6 Claims, 3 Drawing Sheets

NEGATIVE ELECTRODE MATERIAL AND BATTERY

BACKGROUND

1. Technical Field

The present disclosure relates to a negative electrode material (for a battery) and a battery.

2. Description of the Related Art

Japanese Unexamined Patent Application Publication No. 2000-313609 discloses a boron-substituted graphite produced by carbonizing an infusible carbonaceous material in which a boron compound is mixed, immediately heating the carbonized material in an inert atmosphere that does not react with boron in order to perform graphitization, and rapidly cooling the graphitized material. In a boron 1 s spectrum of the boron-substituted graphite which is measured by X-ray photoelectron spectroscopy (XPS), the proportion of the amount of boron determined from the intensity ratio of the B1s peak that occurs in the vicinity of 188 eV to the amount of elements included in the surface layer, which is determined by XPS, is 5 atomic % or less.

Development of a negative electrode material and a battery that have an improved input characteristic without reducing the discharge capacity density of a carbon material has been anticipated.

SUMMARY

In one general aspect, the techniques disclosed here feature a negative electrode material, the material including a carbon material, the carbon material including boron. In a B1s spectrum of the carbon material which is measured by XPS, the ratio of the area of a peak that occurs at a binding energy of 187.0 eV or more and 188.5 eV or less to the total area of peaks that occur at a binding energy of 184.0 eV or more and 196.5 eV or less is 50% or more.

One non-limiting and exemplary embodiment provides a negative electrode material and a battery that have an improved input characteristic without reducing the discharge capacity density of a carbon material.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described below.

Embodiment 1

A negative electrode material according to Embodiment 1 includes a carbon material including boron.

In a B1s spectrum of the carbon material included in the negative electrode material according to Embodiment 1 which is measured by XPS (X-ray photoelectron spectroscopy), the ratio of the area of a peak that occurs at a binding energy of 187.0 eV or more and 188.5 eV or less to the total area of peaks that occur at a binding energy of 184.0 eV or more and 196.5 eV or less is 50% or more.

This enables a negative electrode material and a battery that have an improved input characteristic without reducing the discharge capacity density of the carbon material such as a graphite material to be achieved.

The negative electrode material according to Embodiment 1 includes boron that is in a specific state. The inventor of the present invention analyzed various chemical states of the boron included in the carbon material, studied the reactivity of each of such carbon materials with lithium ions, and, as a result, found that increasing the content of boron that is in a specific state in a carbon material included in the negative electrode material may improve the input characteristic of the negative electrode material without reducing the discharge capacity density of the carbon material such as a graphite material.

The negative electrode material according to Embodiment 1 is considered to have an improved input characteristic due to the following reasons.

The number of electrons included in a boron atom is smaller than the number of electrons included in a carbon atom by one. Thus, controlling the amount of boron included in a carbon material to be appropriate is considered to reduce the density of electrons in the carbon material. A reduction in electron density increases the likelihood of the carbon material receiving electrons from positively charged cations such as lithium ions. This presumably improves the input characteristic of the negative electrode material.

Examples of a state of boron include the state in which a boron atom is bonded to a carbon atom, the state in which a boron atom is bonded to another boron atom, and the state in which a boron atom is bonded to a trace element such as an oxygen atom or a nitrogen atom. Examples of the boron atom bonded to a carbon atom include a boron atom dissolved inside a carbon layer, a boron atom dissolved between carbon layers, and a boron atom included in a carbide such as $B_4C$.

The peak that occurs at a binding energy of 187.0 eV or more and 188.5 eV or less in the B1s spectrum of a carbon material which is measured by XPS is considered to result from a bond between a carbon atom and a boron atom dissolved inside carbon layers. Thus, when the proportion of the area of this peak is 50% or more, the ratio of the amount of boron atoms dissolved in the carbon layers and bonded to a carbon atom to the total amount of boron atoms included in the carbon material is sufficiently large. As a result, the density of electrons in the carbon material may be reduced to a sufficient degree. This enables a negative electrode material that has an improved input characteristic without reducing the discharge capacity density of a carbon material such as a graphite material to be produced.

However, if the proportion of the area of a peak that occurs at a binding energy of 187.0 eV or more and 188.5 eV or less is smaller than 50%, the proportion of the amount of boron atoms that are in a chemical state that is not necessary for reducing the density of electrons in the carbon material to the total amount of boron atoms included in the carbon material may be increased. This presumably reduces the discharge capacity density of the carbon material and/or deteriorates the input characteristic of the negative electrode material.

XPS is a type of photoemission spectroscopy techniques. In XPS, the surface of a sample is irradiated with an X-ray, and the energy (i.e., binding energy) of photoelectrons which is measured with reference to that of the X-ray and the number of the photoelectrons are measured. It is possible to analyze elements constituting the sample and the chemical state of the sample on the basis of the energy and number of the photoelectrons.

It is also possible to determine the chemical state of each of the elements by calculating the proportion of the area of a peak corresponding to the element at a specific binding energy.

The proportion of the area of a peak can be calculated in the following manner. The integrated intensities of peaks that occur in a Bis spectrum at a binding energy of 184.0 eV or more and 196.5 eV or less are calculated. A peak corresponding to each chemical state is defined using a Gaussian function or a Lorentz function, and peak fitting is done. The integrated intensity of each peak is calculated on the basis of the results of the peak fitting. Thus, the proportion of the area of each peak can be calculated. When the peaks are asymmetrical, the asymmetry of the peaks may be taken into account.

In the case where the carbon material, such as a graphite material, is covered with another element or a compound, the above measurement may be conducted while the surface of the sample is ion-etched with an Ar-ion gun or the like.

In the negative electrode material according to Embodiment 1, the content of boron in the carbon material may be 1% or more of the total amount of the carbon material in terms of the atomic mass of boron.

This may further increase the discharge capacity density of the battery and further improves the input characteristic of the battery.

In the negative electrode material according to Embodiment 1, the content of boron in the carbon material may be 3% or more of the total amount of the carbon material in terms of the atomic mass of boron.

This may further improve the input characteristic of the battery.

In the negative electrode material according to Embodiment 1, the carbon material may be a graphite material.

This enables a negative electrode material and a battery that have an improved input characteristic in addition to the high discharge capacity density of a graphite material to be produced.

The content of boron can be measured by inductively coupled plasma (ICP) emission spectrometry.

In Embodiment 1, the ratio of the area of a peak that occurs at a binding energy of 187.0 eV or more and 188.5 eV or less to the total area of peaks that occur at a binding energy of 184.0 eV or more and 196.5 eV or less in the B1s spectrum measured by XPS may be set to be as high as possible, that is, specifically, for example, may be higher than 83%.

Method for Preparing Carbon Material

A method for preparing a graphite material is described below as an example of a method for preparing the carbon material included in the negative electrode material according to Embodiment 1. The graphite material can be prepared by, for example, mixing a boron source with an organic material or an amorphous carbon material that serves as a carbon source, and firing the resulting mixture in an inert atmosphere.

The organic material that serves as a carbon source may be a synthetic resin such as polyvinyl alcohol. The synthetic resin may be in sheet form, fibrous, particulate, or the like. The synthetic resin is preferably a particulate or short-fibrous synthetic resin having a size of a few micrometers to several tens of micrometers in consideration of ease of post-firing processing. The heat treatment is preferably performed at 2,100° C. to 3,000° C. The atmosphere in which the firing treatment is performed is suitably an inert gas such as nitrogen, argon, helium, neon, or the like. While the organic material is heated to about 1,000° C., elements other than carbon evaporate from the raw material used as a carbon source. Thus, carbonization of the raw material proceeds. Subsequently, while the organic material is heated to 2,100° C. to 3,000° C., graphitization of carbon proceeds. Meanwhile, the carbon source and the boron source react with each other and, as a result, dissolution of boron in the carbon layers proceeds.

The amorphous carbon material may be soft carbon such as petroleum coke or coal coke. The soft carbon may be in sheet form, fibrous, particulate, or the like. The soft carbon is preferably a particulate or short-fibrous soft carbon having a size of a few micrometers to several tens of micrometers in consideration of ease of post-firing processing. The heat treatment is preferably performed at 2,100° C. to 3,000° C. The atmosphere in which the firing treatment is performed is suitably an inert gas such as nitrogen, argon, helium, neon, or the like. This heat treatment causes graphitization of carbon to proceed. Meanwhile, the carbon source and the boron source react with each other and, as a result, dissolution of boron in the carbon layers proceeds.

Graphite has a structure in which hexagonal network plane layers constituted by carbon atoms are stacked on top of one another in a regular pattern. Specifically, the term "graphite" refers to highly crystalline carbon constituted by carbon layers that are arranged at plane intervals of 3.4 Å or less and have a crystallite thickness of 100 Å or more. It is also important to increase the degree of graphitization of a carbon material for negative electrodes in order to increase the capacity of the carbon material. The plane intervals at which the carbon layers are arranged and the crystallite thickness of the carbon layers can be determined by, for example, the X-ray diffraction analysis of the carbon material.

The boron source may be a diboride such as aluminium diboride or magnesium diboride. Since the above diborides have a crystal structure analogous to that of graphite and are capable of being decomposed at low temperatures, using the above diborides as a boron source enables both dissolution of boron in the carbon layers and graphitization of the carbon material to proceed in an effective manner.

The ratio between the carbon source and the boron source may be such that the amount of boron source is 1.0% to 30% of the amount of carbon source in terms of the atomic mass of boron. If the amount of boron source is less than 1.0% of the amount of carbon source in terms of the atomic mass of boron, the number of boron atoms, which reduce the density of electrons in the carbon layers, may become excessively small. If the amount of boron source is more than 30% of the amount of carbon source in terms of the atomic mass of boron, the proportion of boron carbide, such as $B_4C$, may become large.

The proportion of the area of a peak that occurs at a binding energy of 187.0 eV or more and 188.5 eV or less can be controlled by, for example, changing the type of the carbon source used, the type of the boron source used, the ratio between the carbon source and the boron source, or the heat-treatment conditions in the preparation of the graphite material.

As described above, a method for producing a graphite material according to an example of Embodiment 1 includes preparing an organic material or an amorphous carbon material that serves as a carbon source; mixing the organic material or the amorphous carbon material with a boron source; and heating the resulting mixture in an inert atmosphere.

Embodiment 2

Embodiment 2 is described below. Parts of the description of Embodiment 2 which are the same as those in Embodiment 1 above are omitted, as appropriate.

A battery according to Embodiment 2 includes a negative electrode, a positive electrode, and an electrolyte.

The negative electrode includes the negative electrode material according to Embodiment 1.

The above-described battery has a high discharge capacity density and an improved input characteristic.

In the battery according to Embodiment 2, the negative electrode material according to Embodiment 1 (i.e., carbon material) included in the negative electrode may serve as a main component.

In other words, the amount of the negative electrode material according to Embodiment 1 (i.e., carbon material) included in the negative electrode may be 50% by weight or more of the total amount of negative electrode material such as a negative electrode mixture layer.

In such a case, the discharge capacity density of the battery may be further increased and the input characteristic of the battery may be further improved.

In another case, the amount of the negative electrode material according to Embodiment 1 (i.e., carbon material) included in the negative electrode may be 90% by weight or more of the total amount of negative electrode material such as a negative electrode mixture layer.

In this case, the discharge capacity density of the battery may be further increased and the input characteristic of the battery may be further improved.

In the battery according to Embodiment 2, alternatively, the negative electrode may further include, in addition to the negative electrode material (i.e., carbon material) which serves as a main component, inevitable impurities; starting materials used in the synthesis of the negative electrode material; and by-products, decomposition products, and the like that are produced in the synthesis of the negative electrode material.

In the battery according to Embodiment 2, the amount of the negative electrode material according to Embodiment 1 (i.e., carbon material) included in the negative electrode may be, for example, 100% by weight of the total amount of negative electrode material such as a negative electrode mixture layer which excludes the amount of the inevitable impurities.

In this case, the discharge capacity density of the battery may be further increased and the input characteristic of the battery may be further improved.

Figure 1:
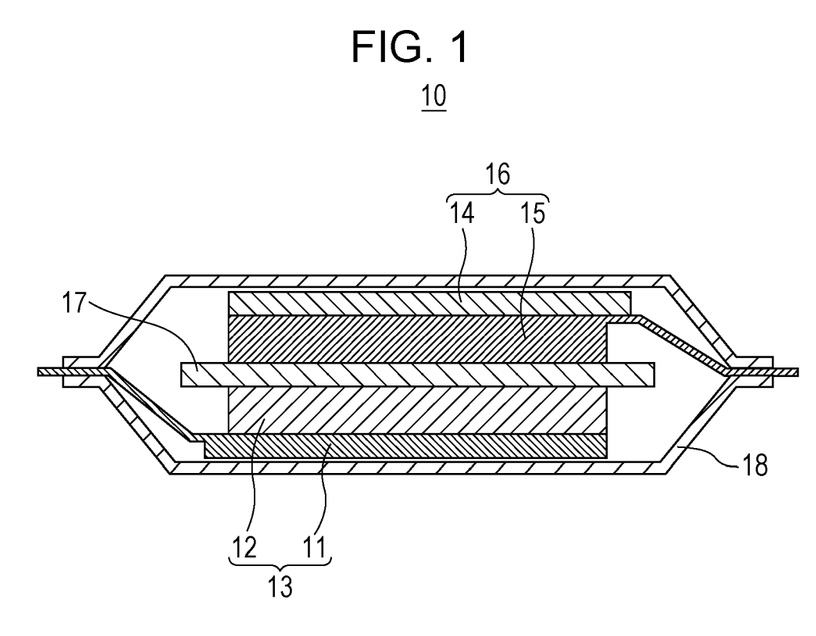
FIG. 1 is a schematic cross-sectional view of an example of a battery according to Embodiment 2.

FIG. 1 is a schematic cross-sectional view of a battery 10, which is an example of the battery according to Embodiment 2.

The battery 10 includes a negative electrode 13, a positive electrode 16, a separator 17, and a package 18 as illustrated in FIG. 1.

The negative electrode 13 includes a negative electrode current collector 11 and a negative electrode mixture layer 12 disposed on the negative electrode current collector 11.

The positive electrode 16 includes a positive electrode current collector 14 and a positive electrode mixture layer 15 disposed on the positive electrode current collector 14.

The negative electrode 13 and the positive electrode 16 face each other across the separator 17.

The battery 10 further includes a package 18 that covers the above components.

The negative electrode 13 includes the negative electrode material according to Embodiment 1.

The negative electrode 13 may optionally include a negative electrode active material capable of occluding and releasing lithium ions; a conductive aid; an ion conductor; a binder; and the like.

The conductive aid and the ion conductor are used for reducing electrode resistance. Examples of the conductive aid include carbon materials (i.e., carbon conductive aids) such as carbon black, graphite, and acetylene black; and conducting polymers such as polyaniline, polypyrrole, and polythiophene. Examples of the ion conductor include gel electrolytes such as polymethyl methacrylate; organic solid electrolytes such as polyethylene oxide; and inorganic solid electrolytes such as $Li_7La_3Zr_2O_{12}$.

The binder is used for improving the binding property of a material of electrodes. Specific examples of the binder include polyvinylidene fluoride, a vinylidene fluoride-hexafluoropropylene copolymer, a vinylidene fluoride-tetrafluoroethylene copolymer, polytetrafluoroethylene, carboxymethylcellulose, polyacrylic acid, a styrene-butadiene rubber, polypropylene, polyethylene, and polyimide.

The negative electrode current collector 11 may be a porous or non-porous sheet or film made of a metal such as stainless steel, nickel, copper, or an alloy of these metals. Examples of the sheet and film include a metal foil and a mesh. A carbon material, such as carbon, that serves as a conductive auxiliary material may be applied onto the surface of the negative electrode current collector 11 in order to reduce resistance, to impart a catalytic effect, and to increase the degree of bonding between the negative electrode mixture layer 12 and the negative electrode current collector 11 by causing the negative electrode mixture layer 12 and the negative electrode current collector 11 to be chemically or physically bonded to each other.

The positive electrode mixture layer 15 includes a positive electrode active material capable of occluding and releasing lithium ions.

The positive electrode mixture layer 15 may optionally include a conductive aid, an ion conductor, a binder, and the like that are the same as those that may be optionally included in the negative electrode mixture layer 12.

The positive electrode active material is a material capable of occluding and releasing lithium ions. Examples of the positive electrode active material include a lithium-metal-containing, transition-metal oxide, a transition-metal fluoride, a polyanionic material, a fluorinated polyanionic material, and a transition-metal sulfide. Among the above positive electrode active materials, in particular, a lithium-metal-containing, transition-metal oxide is preferably used because it reduces the production cost and increases the average discharge voltage.

The positive electrode current collector 14 may be a porous or non-porous sheet or film made of a metal such as aluminium, stainless steel, titanium, or an alloy of these metals. Among the above materials, aluminium and an alloy of aluminium are preferable because they are not expensive and it is easy to reduce the thicknesses of sheets and films made of these materials. Examples of the sheet and film include a metal foil and a mesh. A carbon material, such as carbon, may be applied onto the surface of the positive electrode current collector 14 in order to reduce resistance, to impart a catalytic effect, and to increase the degree of bonding between the positive electrode mixture layer 15 and the positive electrode current collector 14 by causing the positive electrode mixture layer 15 and the positive electrode current collector 14 to be chemically or physically bonded to each other.

The electrolyte used in Embodiment 2 may be a nonaqueous electrolyte. Examples of the electrolyte used in Embodiment 2 include electrolyte solutions that include a lithium salt and a nonaqueous solvent; gel electrolytes; and solid electrolytes.

Examples of the lithium salt include lithium hexafluorophosphate ($LiPF_6$), lithium tetrafluoroborate ($LiBF_4$), lithium perchlorate ($LiClO_4$), lithium bistrifluoromethylsulfonylimide ($LiN(SO_2CF_3)_2$), lithium bisperfluoroethylsulfonylimide ($LiN(SO_2C_2F_5)_2$), lithium bisfluoromethylsulfonylimide ($LiN(SO_2F)_2$), $LiAsF_6$, $LiCF_3SO_3$, and lithium difluoro(oxalato)borate. Among the above lithium salts, in particular, $LiPF_6$ is preferably used in terms of the safety and thermal stability of the battery and ionic conductivity. The above electrolyte salts may be used alone or in combination of two or more.

Examples of the nonaqueous solvent include nonaqueous solvents used in common batteries, such as cyclic carbonates, chain carbonates, esters, cyclic ethers, chain ethers, nitriles, and amides. The above nonaqueous solvents may be used alone or in combination of two or more.

Examples of the cyclic carbonates include ethylene carbonate, propylene carbonate, and butylene carbonate. Some or all of the hydrogen groups included in the above cyclic carbonates may be fluorinated. Examples of such cyclic carbonates include trifluoropropylene carbonate and fluoroethyl carbonate.

Examples of the chain carbonates include dimethyl carbonate, ethyl methyl carbonate, diethyl carbonate, methylpropyl carbonate, ethylpropyl carbonate, and methylisopropyl carbonate. Some or all of the hydrogen groups included in the above chain carbonates may be fluorinated.

Examples of the esters include methyl acetate, ethyl acetate, propyl acetate, methyl propionate, ethyl propionate, and γ-butyrolactone.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ether.

Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile.
Examples of the amides include dimethylformamide.

EXAMPLES

Examples described below are merely examples and do not limit the present disclosure.

Example 1

Preparation of Negative Electrode Material

An aluminium diboride powder was mixed with a petroleum coke powder having an average particle diameter of 12 μm such that the amount of aluminium diboride powder was 3.0% of the amount of petroleum coke powder in terms of the atomic mass of boron with an agate mortar while being pulverized. The resulting mixture was heated from the room temperature to 2,800° C. at a rate of 10° C./min in a tubular furnace containing an Ar atmosphere (Ar gas flow rate: 1 L/min) and maintained at 2,800° C. for 1 hour. Subsequently, heating was stopped. After natural cooling was performed, the resulting carbon material was removed from the tubular furnace. The carbon material prepared by the above firing treatment was then pulverized with an agate mortar and classified with an SUS standard sieve having an aperture of 40 μm. Thus, a carbon powder was prepared.

A negative electrode material (i.e., a carbon material) of Example 1 was prepared in the above-described manner.

Preparation of Test Electrode

The above-obtained negative electrode material and a binder, which was polyvinylidene fluoride, were weighed such that the ratio of the weight of the negative electrode material to the weight of the binder was 9:1.

The above materials were dispersed in a NMP solvent to form a slurry.

The slurry was applied to a Cu current collector with a coating machine.

The resulting electrode plate was rolled with a rolling mill and subsequently cut into a square shape with 20-mm sides by punching.

This square plate was worked into an electrode. Thus, a test electrode of Example 1 was prepared.

Preparation of Evaluation Cell

A lithium secondary battery (i.e., an evaluation cell) including counter and reference electrodes composed of lithium metal was prepared using the test electrode.

An electrolyte solution and the evaluation cell were prepared in a glove box containing an Ar atmosphere having a dew point of −60° C. or less and an oxygen concentration of 1 ppm or less.

The electrolyte solution was prepared by dissolving 1-mol % lithium hexafluorophosphate ($LiPF_6$) in a mixed solvent of ethylene carbonate and ethyl methyl carbonate (volume ratio of ethylene carbonate to ethyl methyl carbonate: 1:3).

The counter electrode was prepared by press-bonding lithium metal to a square nickel mesh with 20-mm sides.

The test and counter electrodes were arranged to face each other across a polyethylene microporous separator impregnated with the electrolyte solution and subsequently placed inside a package. Then, the package was sealed.

The evaluation cell of Example 1 was prepared in the above-described manner.

Example 2

An aluminium diboride powder was mixed with a petroleum coke powder having an average particle diameter of 12 μm such that the amount of aluminium diboride powder was 5.0% of the amount of petroleum coke powder in terms of the atomic mass of boron with an agate mortar while being pulverized.

A negative electrode material of Example 2 was prepared as in Example 1, except for the above point.

A test electrode and an evaluation cell of Example 2 were prepared as in Example 1.

Example 3

An aluminium diboride powder was mixed with a petroleum coke powder having an average particle diameter of 12 μm such that the amount of aluminium diboride powder was 10.0% of the amount of petroleum coke powder in terms of the atomic mass of boron with an agate mortar while being pulverized.

A negative electrode material of Example 3 was prepared as in Example 1, except for the above point.

A test electrode and an evaluation cell of Example 3 were prepared as in Example 1.

Example 4

An aluminium diboride powder was mixed with a polyvinyl alcohol powder having an average molecular weight of 1,000 such that the amount of aluminium diboride powder was 20.0% of the amount of polyvinyl alcohol powder in terms of the atomic mass of boron with an agate mortar while being pulverized.

A negative electrode material of Example 4 was prepared as in Example 1, except for the above point.

A test electrode and an evaluation cell of Example 4 were prepared as in Example 1.

Example 5

An aluminium diboride powder was mixed with a polyvinyl alcohol powder having an average molecular weight of 1,000 such that the amount of aluminium diboride powder was 30.0% of the amount of polyvinyl alcohol powder in terms of the atomic mass of boron with an agate mortar while being pulverized.

A negative electrode material of Example 5 was prepared as in Example 1, except for the above point.

A test electrode and an evaluation cell of Example 5 were prepared as in Example 1.

Example 6

A magnesium diboride powder was mixed with a petroleum coke powder having an average particle diameter of 12 μm such that the amount of magnesium diboride powder was 10.0% of the amount of petroleum coke powder in terms of the atomic mass of boron with an agate mortar while being pulverized.

A negative electrode material of Example 6 was prepared as in Example 1, except for the above point.

A test electrode and an evaluation cell of Example 6 were prepared as in Example 1.

Comparative Example 1

A petroleum coke powder having an average particle diameter of 12 μm was heated from the room temperature to 2,800° C. at a rate of 10° C./min in a tubular furnace containing an Ar atmosphere (Ar gas flow rate: 1 L/min) and maintained at 2,800° C. for 1 hour.

A negative electrode material of Comparative Example 1 was prepared as in Example 1, except for the above point.

A test electrode and an evaluation cell of Comparative Example 1 were prepared as in Example 1.

Comparative Example 2

A boron oxide powder was mixed with a petroleum coke powder having an average particle diameter of 12 μm such that the amount of boron oxide powder was 10.0% of the amount of petroleum coke powder in terms of the atomic mass of boron with an agate mortar while being pulverized.

A negative electrode material of Comparative Example 2 was prepared as in Example 1, except for the above point.

A test electrode and an evaluation cell of Comparative Example 2 were prepared as in Example 1.

Comparative Example 3

A boron oxide powder was mixed with a petroleum coke powder having an average particle diameter of 12 μm such that the amount of boron oxide powder was 20.0% of the amount of petroleum coke powder in terms of the atomic mass of boron with an agate mortar while being pulverized.

A negative electrode material of Comparative Example 3 was prepared as in Example 1, except for the above point.

A test electrode and an evaluation cell of Comparative Example 3 were prepared as in Example 1.

Comparative Example 4

A boron oxide powder was mixed with a polyvinyl alcohol powder having an average molecular weight of 1,000 such that the amount of boron oxide powder was 20.0% of the amount of polyvinyl alcohol powder in terms of the atomic mass of boron with an agate mortar while being pulverized.

A negative electrode material of Comparative Example 4 was prepared as in Example 1, except for the above point.

A test electrode and an evaluation cell of Comparative Example 4 were prepared as in Example 1.

Comparative Example 5

A boron carbide powder was mixed with a petroleum coke powder having an average particle diameter of 12 μm such that the amount of boron carbide powder was 5.0% of the amount of petroleum coke powder in terms of the atomic mass of boron with an agate mortar while being pulverized.

A negative electrode material of Comparative Example 5 was prepared as in Example 1, except for the above point.

A test electrode and an evaluation cell of Comparative Example 5 were prepared as in Example 1.

Analysis of Carbon Materials

The negative electrode materials prepared in Examples 1 to 6 and Comparative Examples 1 to 5 were each subjected to an XRD analysis. The results of the XRD analysis confirmed that carbon layers included in each of the negative electrode materials prepared in Examples 1 to 6 and Comparative Examples 1 to 5 were arranged at intervals of 3.4 Å or less and had a crystallite thicknesses of 100 Å or more. In other words, it was confirmed that the negative electrode materials, that is, the carbon materials, prepared in Examples 1 to 6 and Comparative Examples 1 to 5 were all graphite.

The negative electrode materials prepared in Examples 1 to 6 and Comparative Examples 1 to 5 were also analyzed by XPS and inductively coupled plasma-atomic emission spectroscopy (ICP-AES).

In the ICP-AES analysis, the content of boron in each negative electrode material was measured with an ICP-AES apparatus "CIROS-120" produced by Spectro.

In the XPS analysis, an XPS apparatus "PHI5600" produced by ULVAC-PHI, Inc. was used. The X-ray source used was Al.

The B1s spectrum of each negative electrode material which occurred at a binding energy of 184.0 eV or more and 196.5 eV or less was measured.

On the basis of the B1s spectrum, the ratio of the area of a peak that occurred at a binding energy of 187.0 eV or more and 188.5 eV or less to the total area of peaks included in the B1s spectrum was calculated.

The results of XPS analysis of the negative electrode materials prepared in Example 3 and Comparative Example 2 are taken as examples below.

Figure 2:
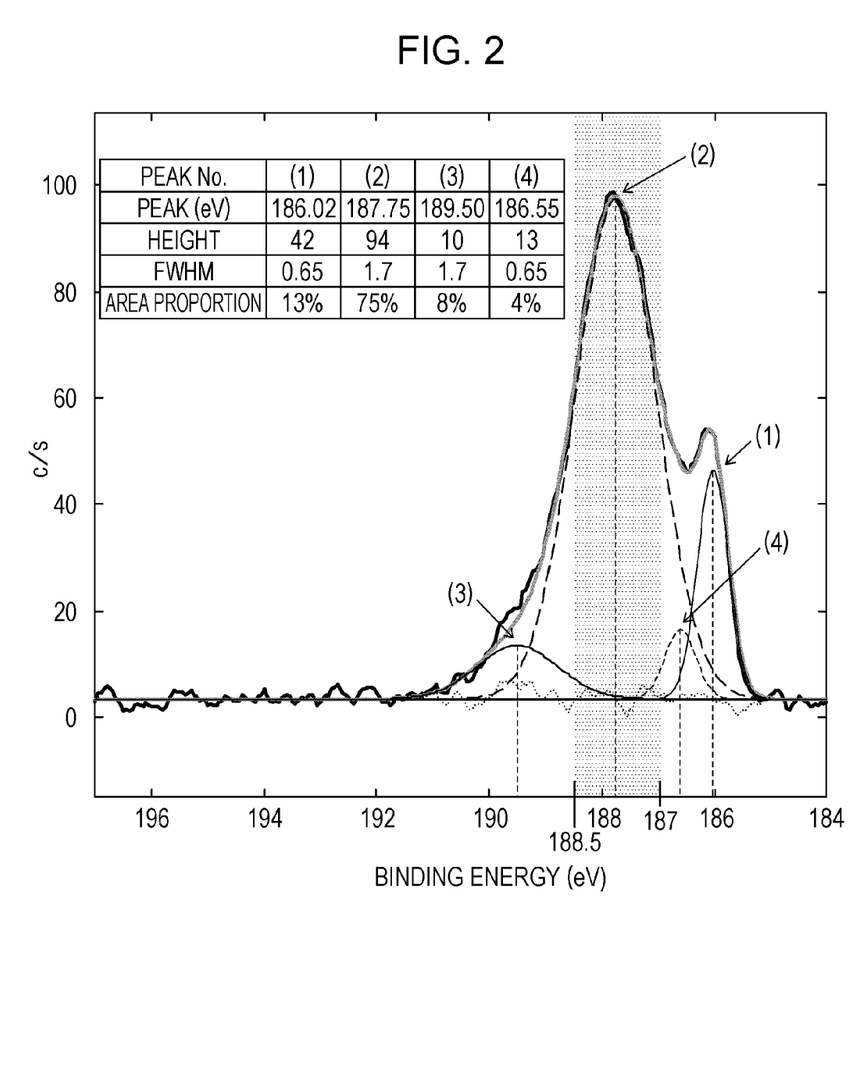
FIG. 2 is a diagram illustrating the results of XPS analysis of a negative electrode material which was prepared in Example 3.

FIG. 2 illustrates the results of XPS analysis of the negative electrode material prepared in Example 3.

Figure 3:
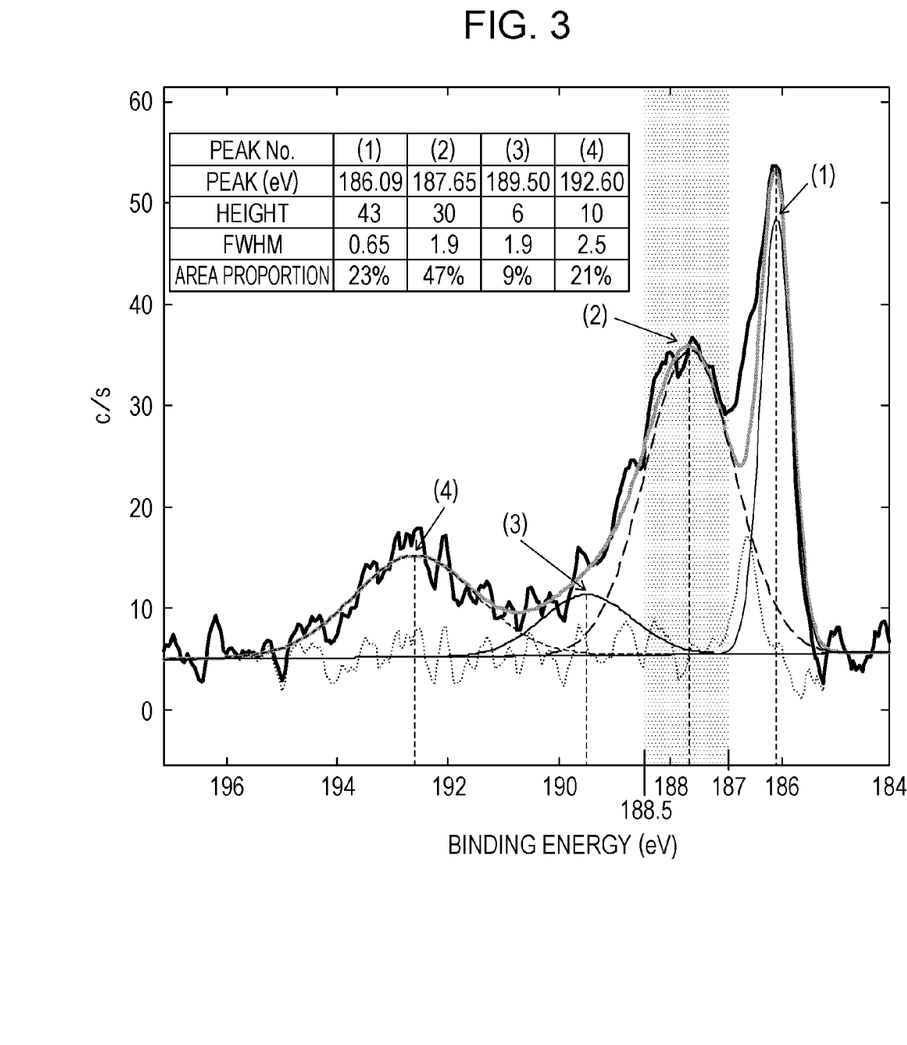
FIG. 3 is a diagram illustrating the results of XPS analysis of a negative electrode material which was prepared in Comparative Example 2.

FIG. 3 illustrates the results of XPS analysis of the negative electrode material prepared in Comparative Example 2.

In both Example 3 and Comparative Example 2, four peaks (i.e., peak Nos. 1 to 4) occurred at a binding energy of 184.0 eV or more and 196.5 eV or less.

For the negative electrode material prepared in Example 3, the total area of the peaks (i.e., peak Nos. 1 to 4) was calculated. The area of a peak that occurred at a binding energy of 187.0 eV or more and 188.5 eV or less (i.e., peak No. 2) was also calculated. The proportion of the area of the peak No. 2 to the total area of the peak Nos. 1 to 4 was 75%.

For the negative electrode material prepared in Comparative Example 2, the total area of the peaks (i.e., peak Nos. 1 to 4) was calculated. The area of a peak that occurred at a binding energy of 187.0 eV or more and 188.5 eV or less (i.e., peak No. 2) was also calculated. The proportion of the area of the peak No. 2 to the total area of the peak Nos. 1 to 4 was 47%.

Charge-Discharge Test

The evaluation cells prepared in Examples 1 to 6 and Comparative Examples 1 to 5 were each subjected to a charge-discharge test and evaluated in terms of charge-discharge characteristic.

A method and the results of the evaluation are described below.

The charge-discharge test of the evaluation cells was made in a thermostat maintained at 25° C.

In the charge-discharge test, a test electrode including each negative electrode material was charged and, after a pause of 20 minutes, discharged.

The initial discharging capacity (i.e., charge-discharge characteristic) of the test electrode was evaluated by the following method.

The test electrode was charged at a constant current of 18.6 mA per weight of the negative electrode material, which corresponded to a rate of 1/20 C based on the theoretical capacity density of graphite (372 mAh/g) until the difference in potential between the test electrode and the reference electrode reached 0 V.

The test electrode was discharged at a constant current of 18.6 mA per weight of the negative electrode material until the difference in potential between the test electrode and the reference electrode reached 2 V. Thus, the initial discharging capacity of the test electrode was determined.

The input characteristic of the test electrode was evaluated by the following method.

The test electrode was charged at a constant current of 372 mA per weight of the negative electrode material, which corresponded to a rate of 1 C based on the theoretical capacity density of graphite (372 mAh/g) until the difference in potential between the test electrode and the reference electrode reached 0 V.

The charging capacity of the test electrode which was measured when the test electrode was charged at a rate of 1 C divided by the charging capacity of the test electrode which was measured when the test electrode was charged at a rate of 1/20 C provided a quotient that was considered to be the 1 C input characteristic (%) of the test electrode.

Table 1 summarizes the results of the charge-discharge test of each of the evaluation cells prepared in Examples 1 to 6 and Comparative Examples 1 to 5, the ratio of the area of a peak that occurred at a binding energy of 187.0 eV or more and 188.5 eV or less to the total area of the peaks that occurred at a binding energy of 184.0 eV or more and 196.5 eV or less in a B1s spectrum of each of the negative electrode materials and the boron content in each of the evaluation cells.

In the graphite material prepared in Comparative Example 1, a clear peak was not confirmed at a binding energy of 187.0 eV or more and 188.5 eV or less in the XPS analysis and the boron content was below the detection limit. Thus, the hyphen "-" is shown in the columns.

TABLE 1

| | Results of analysis of graphite material | | Results of charge-discharge test | |
|---|---|---|---|---|
| | XPS | | | |
| | Ratio of peak area at 187.0 eV or more and 188.5 eV or less [%] | ICP Boron content [wt. %] | Initial discharging capacity [mAh/g] | 1 C input characteristic [%] |
| Example 1 | 83 | 1.1 | 306 | 85.9 |
| Example 2 | 79 | 3.0 | 312 | 88.3 |
| Example 3 | 75 | 3.8 | 324 | 89.4 |
| Example 4 | 70 | 4.1 | 332 | 87.8 |
| Example 5 | 50 | 10.1 | 300 | 89.2 |
| Example 6 | 55 | 1.8 | 319 | 88.5 |
| Comparative example 1 | — | — | 301 | 59.7 |
| Comparative example 2 | 47 | 0.2 | 320 | 77.5 |
| Comparative example 3 | 44 | 9.6 | 278 | 79.1 |
| Comparative example 4 | 40 | 3.6 | 286 | 75.1 |
| Comparative example 5 | 39 | 2.5 | 283 | 75.8 |

Discussion

The results described in Table 1 confirm that the charge-discharge characteristic of the evaluation cells greatly varied depending on the state of boron included in the graphite material.

The negative electrode material prepared in Example 5 had a boron content of 10.1 wt. % and an initial discharge capacity density of 300 mAh/g, which was comparable to that of a graphite material that did not include boron. In addition, the 1 C input characteristic of the negative electrode material prepared in Example 5 was high, that is, specifically, 89.2%.

The negative electrode material prepared in Comparative Example 3 had a boron content of 9.6 wt. %, which was comparable to that of the negative electrode material prepared in Example 5.

However, the negative electrode material prepared in Comparative Example 3 had a low initial discharge capacity density of 278 mAh/g and a low 1 C input characteristic of 79.1%.

In a B1s spectrum of the negative electrode material prepared in Comparative Example 3 which was measured by XPS, the ratio of the area of a peak that occurred at a binding energy of 187.0 eV or more and 188.5 eV or less to the total area of the peaks that occurred at a binding energy of 184.0 eV or more and 196.5 eV or less was low, that is, specifically, 44%.

Therefore, the proportion of boron dissolved in carbon layers was low, which presumably increased the proportion of boron that did not contribute to a reduction in the density of electrons in the carbon material. Thus, the negative electrode material prepared in Comparative Example 3 had a low initial discharge capacity and a low 1 C input characteristic although having a boron content comparable to that of the negative electrode material prepared in Example 5.

The above results confirm that it was necessary to limit, in the B1s spectrum measured by XPS, the ratio of the area of a peak that occurred at a binding energy of 187.0 eV or more and 188.5 eV or less to the total area of the peaks that occurred at a binding energy of 184.0 eV or more and 196.5 eV or less to be 50% or more in order to improve the input characteristic of the negative electrode material without reducing the discharge capacity density of the graphite material.

In the negative electrode materials prepared in Examples 1 to 6, the ratio of the area of a peak that occurred at a binding energy of 187.0 eV or more and 188.5 eV or less to the total area of the peaks that occurred at a binding energy of 184.0 eV or more and 196.5 eV or less in the B1s spectrum measured by XPS was 50% or more. Therefore, the negative electrode materials prepared in Examples 1 to 6 each had an initial discharge capacity density of 300 mAh/g or more and a discharge capacity density equal to or higher than that of a graphite material that does not include boron. The negative electrode materials prepared in Examples 1 to 6 had a high 1 C input characteristic of 85.1% or more.

In contrast, the negative electrode materials prepared in Comparative Examples 1 to 5 had a low 1 C input characteristic of 79.1%.

In particular, in Comparative Examples 3 to 5, the ratio of the area of a peak that occurred at a binding energy of 187.0 eV or more and 188.5 eV or less to the total area of the peaks that occurred at a binding energy of 184.0 eV or more and 196.5 eV or less in the B1s spectrum measured by XPS was 44% or less. Therefore, in Comparative Examples 3 to 5, the proportion of boron that served as impurities was large. Accordingly, the negative electrode materials prepared in Comparative Examples 3 to 5 had a lower initial discharging capacity than the negative electrode material prepared in Comparative Example 1, which was a graphite material that did not include boron.

In the negative electrode materials prepared in Examples 2 to 5, the boron content was 3 wt. % or more. This presumably increased the absolute amount of boron dissolved in carbon layers. Consequently, the negative electrode materials prepared in Examples 2 to 5 had a high 1 C input characteristic of 87.8% or more.

The above-described negative electrode material may be suitably used as a material of electrodes of batteries such as lithium secondary batteries.

What is claimed is:

1. A negative electrode material, comprising:
a carbon material,
the carbon material including boron,
wherein, in a B1s spectrum of the carbon material which is measured by X-ray photoelectron spectroscopy, the ratio of the area of a peak that occurs at a binding energy of 187.0 eV or more and 188.5 eV or less to the total area of peaks that occur at a binding energy of 184.0 eV or more and 196.5 eV or less is 50% or more.

2. The negative electrode material according to claim 1, wherein the content of the boron in the carbon material is 1% or more in terms of the atomic mass of boron.

3. The negative electrode material according to claim 2, wherein the content of the boron in the carbon material is 3% or more in terms of the atomic mass of boron.

4. The negative electrode material according to claim 1, wherein the carbon material is a graphite material.

5. A battery comprising:
a negative electrode including a negative electrode material;
a positive electrode; and
an electrolyte,
the negative electrode material including a carbon material,
the carbon material including boron,
wherein, in a B1s spectrum of the carbon material which is measured by X-ray photoelectron spectroscopy, the ratio of the area of a peak that occurs at a binding energy of 187.0 eV or more and 188.5 eV or less to the total area of peaks that occur at a binding energy of 184.0 eV or more and 196.5 eV or less is 50% or more.

6. The battery according to claim 5, wherein the negative electrode material included in the negative electrode serves as a main component.

* * * * *